United States Patent
Hung et al.

(10) Patent No.: US 9,036,271 B2
(45) Date of Patent: May 19, 2015

(54) LENS DEVICE AND METHOD OF MANUFACTURING THE SAME

(75) Inventors: Kuo-Yung Hung, Hsinchu (TW); Fan-Gang Tseng, New Taipei (TW)

(73) Assignee: NATIONAL CHIAO TUNG UNIVERSITY, Hsinchu (TW)

(*) Notice: Subject to any disclaimer, the term of this patent is extended or adjusted under 35 U.S.C. 154(b) by 880 days.

(21) Appl. No.: 13/278,224

(22) Filed: Oct. 21, 2011

(65) Prior Publication Data
US 2012/0320466 A1  Dec. 20, 2012

(30) Foreign Application Priority Data

Jun. 17, 2011 (TW) .............................. 100121251 A

(51) Int. Cl.
*B29D 11/00* (2006.01)
*G02B 3/02* (2006.01)
*G02B 3/14* (2006.01)

(52) U.S. Cl.
CPC ............ *B29D 11/00365* (2013.01); *G02B 3/14* (2013.01)

(58) Field of Classification Search
CPC .............................. G02B 3/14; B29D 11/00365
See application file for complete search history.

(56) References Cited

U.S. PATENT DOCUMENTS

| | | | |
|---|---|---|---|
| 5,968,422 A | 10/1999 | Kennedy | |
| 6,215,591 B1 | 4/2001 | Ueda et al. | |
| 6,841,096 B2 | 1/2005 | Quake et al. | |
| 6,936,196 B2* | 8/2005 | Chandross et al. | 264/1.36 |
| 7,012,762 B2 | 3/2006 | Tseng et al. | |
| 7,561,340 B2* | 7/2009 | Tseng et al. | 359/665 |
| 2007/0121213 A1 | 5/2007 | Tseng et al. | |
| 2008/0068718 A1* | 3/2008 | Yu et al. | 359/620 |
| 2008/0316564 A1* | 12/2008 | Bower et al. | 359/228 |

FOREIGN PATENT DOCUMENTS

TW    I269889    1/2007

OTHER PUBLICATIONS

M. Agarwl, R.A. Gunasekaran, P. Coane and K. Varahramyan, "Polymer-based variable focal length microlens system," J. Micromech. Microeng. 14 (2004) 1665-1673.
K.H. Jeong, L.P. Lee, "A new method of increasing numerical aperature of microlens for biophotonic MEMS", Microtechnologies in Medicine & Biology 2nd Annual Interational IEEE-EMB Special Topic Conference on, 2-4, pp. 380-383, May 2002.
L. W. Chang, "Micro Hybrid UV Curable Electro-shaped Aspheric Lens Fabricated by High Blue Ray Transmission Material," Jul. 2009. (with its English Abstract).
English translation of abstract of TW I269889 (published Jan. 1, 2007).

* cited by examiner

*Primary Examiner* — David N Spector
(74) *Attorney, Agent, or Firm* — McClure, Qualey & Rodack, LLP

(57) ABSTRACT

A lens device and a method of manufacturing the same are provided, wherein the lens device includes a transparent substrate, a metal layer, a hydrophobic layer and an aspherical lens. The metal layer is formed on the transparent substrate, and the hydrophobic layer is formed on the metal layer. The metal layer has a first opening, such that an area of the transparent substrate corresponding to the first opening is not covered by the metal layer. The hydrophobic layer has a second opening connected to the first opening, and the second opening is larger than the first opening, such that a portion of the metal layer adjacent to a peripheral edge of the first opening is not covered by the hydrophobic layer. The aspherical lens is formed on the area of the transparent substrate and contacts the portion of the metal layer.

10 Claims, 7 Drawing Sheets

LENS DEVICE AND METHOD OF MANUFACTURING THE SAME

RELATED APPLICATIONS

This application claims priority to Taiwan Application Serial Number 100121251, filed Jun. 17, 2011, which is herein incorporated by reference.

BACKGROUND

1. Technical Field

The present disclosure relates to an optical device and a method of manufacturing the same, and more particularly, to a lens device and a method of manufacturing the same.

2. Description of Related Art

Micro-lenses are widely used in many optical products recently, such as monitors, projectors, mobile phones, cameras, scanners, or sensing components. Aspherical lenses are even widely used as mobile phone lenses or camera lenses in imaging systems. The micro pickup head system is directed to a smaller light point to increase storage capacity.

A micro-aspherical lenses is generally manufactured by using a glass molding forming technique or plastic injection molding technique, but it is not easy to produce a micro-aspherical lens with a curvature which is less than 2 millimeter (mm) when the glass molding forming technique is applied. As for the plastic injection molding technique, it is also limited to a millimeter scale curvature and to a thickness ratio of a central portion to an edge portion of the mold, and the aforementioned two techniques also high molding cost.

In view of the foregoing, in order to further reduce the size of lens and also to decrease the cost, those skilled in the relevant art have tried to develop new components, but it has been a long time for no suitable component being developed. Therefore, how to provide a new technique of manufacturing a micro-lens is one of the important research topics and also becomes an urgent object needing to be improved in the relevant art.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one aspect, the present invention is directed to a creative lens device and a method of manufacturing the same for producing a micro-aspherical lens and reducing its cost.

According to one embodiment of the present invention, the method of manufacturing a lens device includes the following steps: (a) providing a transparent substrate; (b) forming an electrode layer on the transparent substrate; (c) forming a first opening in the electrode layer for exposing an area of the transparent substrate via the first opening; (d) forming a hydrophobic layer on the electrode layer, wherein the hydrophobic layer has a second opening that is connected to the first opening, and the second opening is larger than the first opening, such that a portion of the electrode layer adjacent to a peripheral edge of the first opening is exposed; (e) providing a liquid material of lens on the area of the transparent substrate, wherein the liquid material of lens contacts the portion of the electrode layer adjacent to the peripheral edge of the first opening to enhance adhesion; (f) applying an electrostatic force on the liquid material of lens to adjust a shape of the liquid material of lens to be a liquid aspherical lens; and (g) curing the liquid aspherical lens to form a solid aspherical lens.

In the step (c), a positive photoresist can be patterned on the electrode layer, and thereafter the electrode layer is etched to form the first opening, and then the positive photoresist is removed.

In the step (d), a surface treatment is performed on the area of the transparent substrate; a positive photoresist is formed on the area of the transparent substrate, wherein an outer portion of the positive photoresist extends above the portion of the electrode layer adjacent to the peripheral edge of the first opening; a hydrophobic material is provided to overlay the positive photoresist and the electrode layer; and the positive photoresist and a portion of the hydrophobic material are removed to form the hydrophobic layer, wherein the portion of the hydrophobic material adheres to the positive photoresist directly.

In the step (f), an upper electrode plate is provided above the transparent substrate; and then a voltage difference is provided between the upper electrode plate and the electrode layer so as to produce the electrostatic force being applied on the liquid material of lens.

In the method of manufacturing the lens device, the aforementioned liquid material of lens may be a light-curing plastic material, and in the step (g), the liquid aspherical lens can be illuminated to form the solid aspherical lens.

In the method of manufacturing the lens device, the aforementioned transparent substrate may be a transparent glass substrate or a transparent plastic substrate.

In the method of manufacturing the lens device, the aforementioned electrode layer may be a metal layer. For example, the metal layer is an opaque metal layer, a transparent metal layer, or a translucent metal layer.

According to another embodiment of the present invention, a lens device includes a transparent substrate, a metal layer, a hydrophobic layer, and an aspherical lens. A metal layer is formed on the transparent substrate, and a hydrophobic layer is formed on the metal layer. The metal layer has a first opening, such that an area of the transparent substrate that is exposed via the first opening is not covered by the metal layer. The hydrophobic layer has a second opening connected to the first opening, and the second opening is larger than the first opening, such that a portion of the metal layer adjacent to a peripheral edge of the first opening is not covered by the hydrophobic layer. The aspherical lens is formed on the area of the transparent substrate and contacts the portion of the metal layer adjacent to the peripheral edge of the first opening.

In the transparent device, the transparent substrate is a transparent glass substrate or a transparent plastic substrate.

In the transparent device, the material of the aspherical lens includes a light-curing plastic material.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
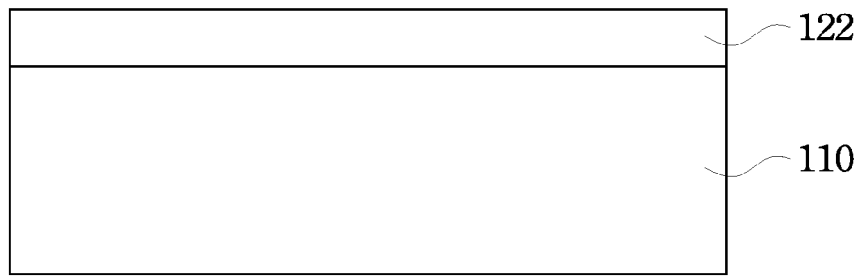
FIG. 1 to FIG. 8 are schematic diagrams showing a method of manufacturing a lens device according to one embodiment of the present invention.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

FIG. 1 to FIG. 8 are schematic diagrams showing a method of manufacturing a lens device according to one embodiment of the present invention. In FIG. 1, a transparent substrate 110 is provided and an electrode layer 122 is formed on the transparent substrate 110. In practice, the material of the transparent substrate 110 may be an inorganic transparent material (e.g., glass, quartz, another suitable material, or the combination thereof), an organic transparent material (e.g., polyolefin, poly sulfide, poly alcohol, polyester, rubber, thermoplastic polymer, thermosetting polymer, poly aromatic hydrocarbons, polymethyl methacrylate, plastic, polycarbonate, another suitable material, derivatives thereof) or combinations thereof. In the embodiment, the transparent substrate 110 may be a transparent glass substrate (e.g., BK7 optical glass substrate) or a transparent plastic substrate. The electrode layer 122 may be a metal layer (e.g., aluminum, or a transparent metal compound, another suitable conductive material, or combinations thereof).

Figure 2:
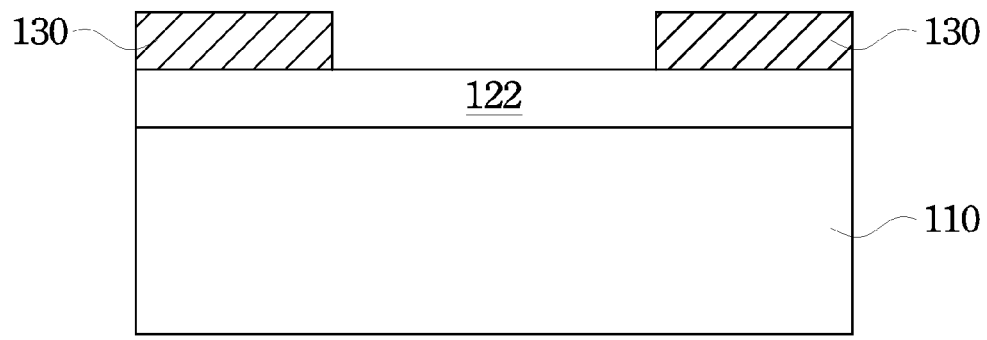

Then, as shown in FIG. 2, a positive photoresist 130 is patterned on the electrode layer 122. In an embodiment, the positive photoresist 130 (e.g., AZ5214 positive photoresist) is first spin-coated at a rotational speed of 3000 rpm for 30 seconds, and then is soft-baked at 100° c. for 1 minute, and thereafter is exposed to an exposure of 50 mJ for 35.7 seconds with a dose of 1.4 mJ/cm$^2$, and then is developed for 45 seconds. The positive photoresist material may be used to protect the electrode layer 122. However, AZ400K developer will attack the aluminum electrode layer 122 if the developing time is too long, and thus the time needs to be well controlled to avoid over-developing. For example, in a developer including AZ400K developer, the ratio of AZ400K to water can be 1:2.

Figure 3:
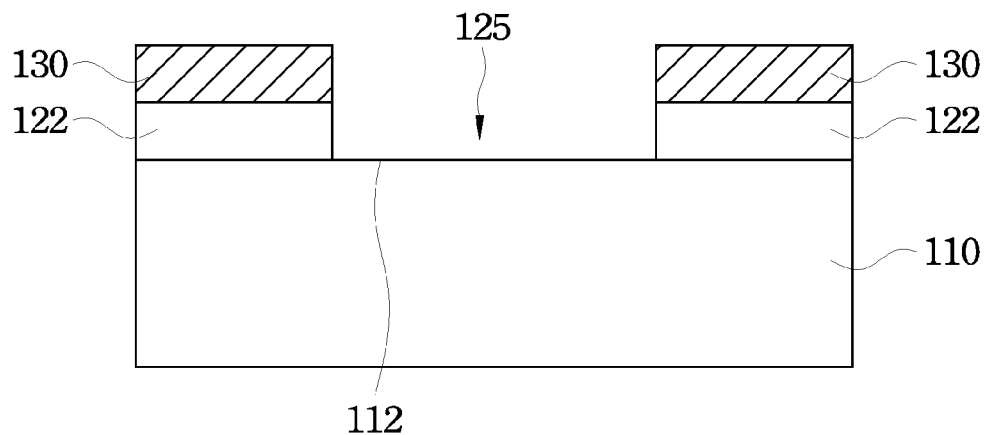

Then, as shown in FIG. 3, after the positive photoresist is patterned, the electrode layer 122 is etched to form a first opening 125 such that the area 112 on the transparent substrate 110 is exposed via the first opening 125. In one embodiment, the etchant recipe is H3PO4:HNO3:CH3COOH:H2O=4:1:4:1, and after being heated to 50° c., the etchant is applied on the electrode layer 122 for performing etching for about 25 to 30 seconds. It should be noted that, when the electrode layer 122 is being prepared, it is most important to stably control the etching rate so as to prevent undercut caused by too high temperature from occurring, wherein the undercut will affect the profile of the lens edge. When the micro-lens is self-assembled by using hydrophilic and hydrophobic properties, uneven profiles may affect the balance between surface tension and interfaces, which affects curvature indirectly.

Figure 4:
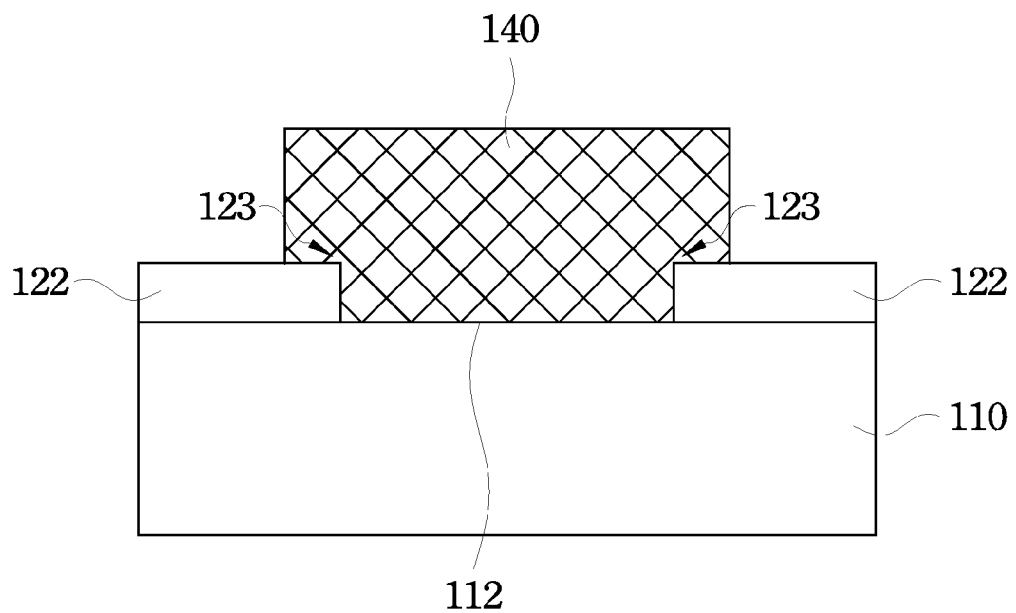

Then, as shown in FIG. 4, the positive photoresist 130 is removed, and thereafter the area 112 of the transparent substrate 110 is performed with a surface treatment. Then, a positive photoresist 140 is formed on the area 112 of the transparent substrate 110, wherein the outer portion of the positive photoresist 140 extends above the portion 123 of the electrode layer 122 adjacent to the peripheral edge of the first opening 125.

As to the manner of the surface treatment, in one embodiment, dimeric trimethylamine (HMDS) is evaporation-deposited on the transparent substrate 110 for 5 minutes to increase joint strength between the transparent substrate 110 and the positive photoresist 140, thereby preventing a defined area from being stripped while developing is performed.

As to the manner of forming the positive photoresist 140, in one embodiment, to define a hydrophilic and hydrophobic interface, the positive photoresist 140 (e.g., AZ9260 positive photoresist) is required to be spin-coated on the transparent substrate 110 at a rotational speed of 2500 rpm for 30 seconds; and then is soft-baked at 100° c. for 2 minutes; and thereafter is exposed to an exposure of 210 mJ; and then is developed, wherein AZ:H2O=1:2 and developing time is about 6 to 8 minutes.

Figure 5:
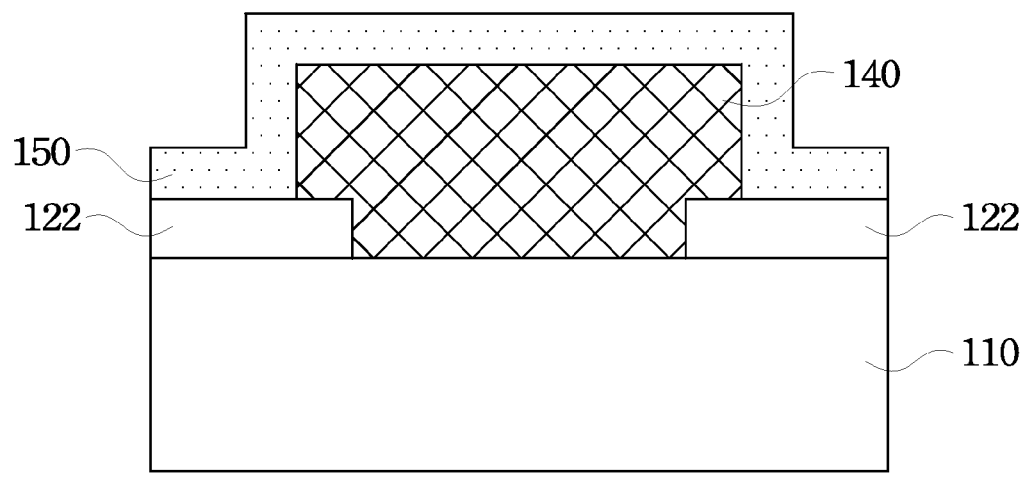

Then, as shown in FIG. 5, a hydrophobic material 150 is provided to cover the positive photoresist 140 and the electrode layer 122. The hydrophobic material 150 may be Teflon, another suitable transparent material, or combinations of thereof. In one embodiment, Teflon can be spin-coated at a rotational speed of 3000 rpm for 30 seconds, and is hard-baked at 120° c. for 10 minutes.

Figure 6:
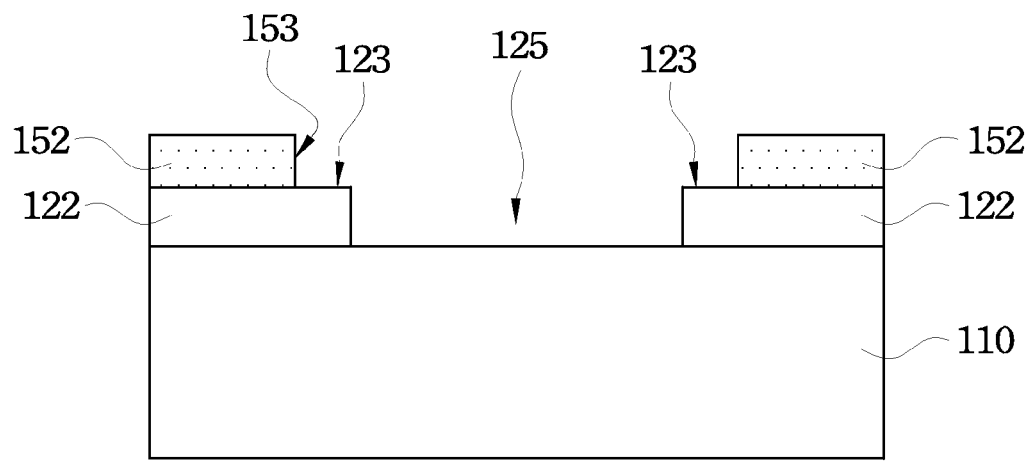

Then, as shown in FIG. 6, the positive photoresist 140 and a portion of the hydrophobic material 150 are removed to form a hydrophobic layer 152, wherein the portion of the hydrophobic material 150 is adhered to the positive photoresist 140 directly. The hydrophobic layer 152 is formed on the electrode layer 122, wherein the hydrophobic layer 152 has a second opening 153 which is connected to the first opening 125 and is larger than the first opening 125, such that the portion 123 of the electrode layer 122 adjacent to a peripheral edge of the first opening 125 is exposed.

Figure 7:
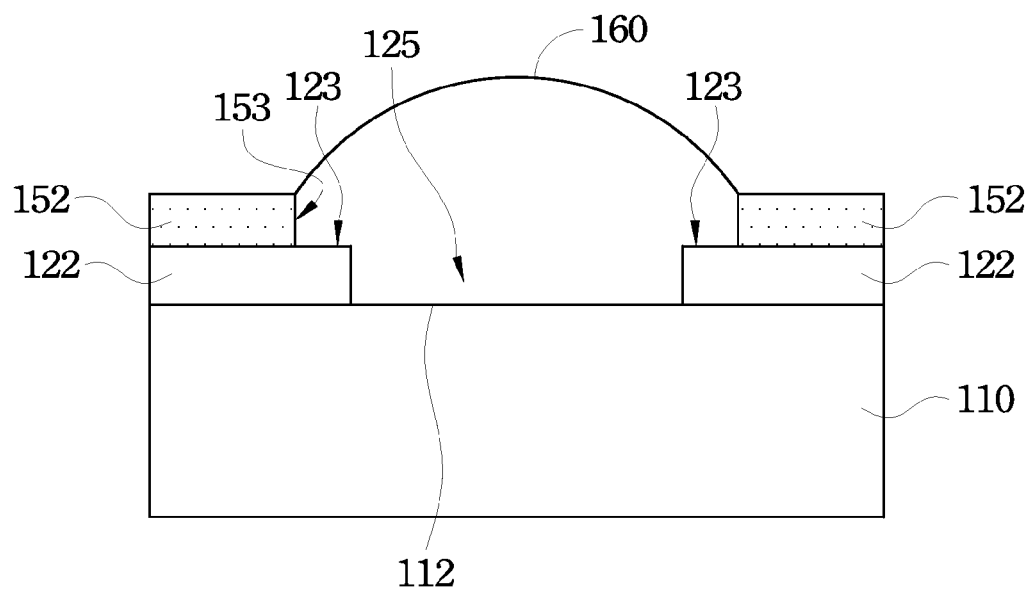

Then, as shown in FIG. 7, a liquid material of lens 160 is provided on the area 112 of the transparent substrate 110, where the liquid material of lens 160 contacts the portion 123 of the electrode layer 122 adjacent to the peripheral edge of the first opening 125 to enhance adhesion, i.e., a lateral grasping force. Since the hydrophobic layer 152 is formed, the liquid material of lens 160 may not overflow from the second opening 153 easily.

Figure 8:
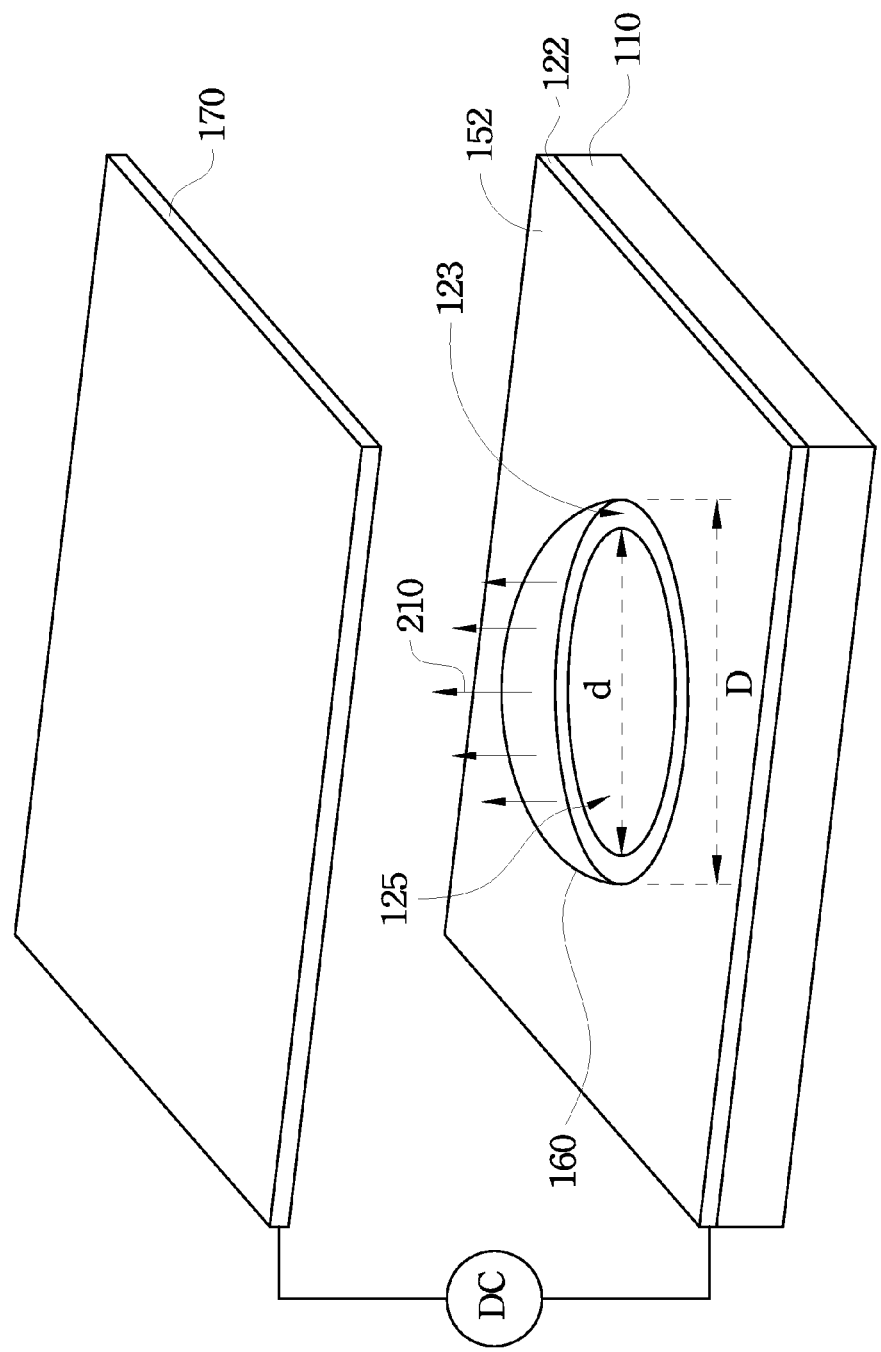

Then, as shown in FIG. 8, an upper electrode plate 170 is provided above the transparent substrate 110, and a DC power supply provides a voltage difference between the upper electrode plate 170 and the electrode layer 122, thereby producing a electrostatic force 210 applied to the liquid material of lens 160 to adjust a shape of the liquid material of lens 160 to be a liquid aspherical lens, and then the liquid aspherical lens is cured to form a solid aspherical lens. It should be understood that, in comparison with a spherical lens set, the aspherical lens can achieve the same purpose with fewer components. In addition to the reduction of space and cost, the advantage of the aspherical lenses is to improve the spherical aberration of spherical lenses.

In one embodiment, the lens material 160 includes a light-curing plastic material (e.g., UV glue), and thus the upper electrode plate 170 has to be a light-transmissive conductive material layer (e.g., indium tin oxide, indium zinc oxide, indium tin zinc oxide, zinc oxide, alumina, aluminum tin oxide, aluminum zinc oxide, cadmium tin oxide, cadmium zinc oxide, another suitable material, or combinations of thereof).

In practice, for example, the material forming the upper electrode plate 170 is indium tin oxide with a thickness of 1000 Å, and the material forming the electrode layer 122 is aluminum, and the material forming the hydrophobic layer 152 is Teflon. The first opening 125 of the electrode layer 122 is a circular opening with a diameter of d, and the second opening of the hydrophobic layer 152 is a circular opening diameter with a diameter of D, both of which can be combined to integrate the lens material 160 with the transparent substrate 110 as one body, and also to achieve the function of positioning.

Figure 9A:
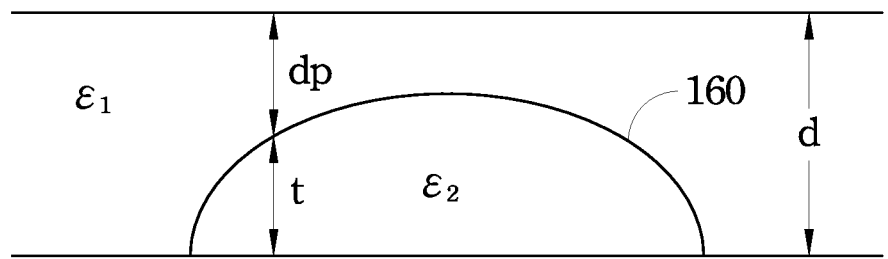
FIG. 9A to FIG. 9C are schematic diagrams showing the states of an aspherical lens which is applied with the electrostatic force.

FIG. 9A is a schematic diagram showing a modulation of an electrostatic force and parameters, where $\epsilon_1$ is a dielectric coefficient of a dielectric material (e.g., air), and $\epsilon_2$ is a dielectric coefficient of the lens material 160, t is a lens height, and d is a space between the upper electrode plate 170 and the electrode layer 122. As shown in Kelvin theory equation (equation 1 shown below), the electrostatic force mainly relates to a difference between dielectric coefficients of materials and gradient distribution of electric field in the system. In equation 2, it can be found that the electrostatic field applied on the lens edge is $\epsilon_1/\epsilon_2$ of its central portion.

$$\vec{F} = \frac{\varepsilon_o}{2}(\varepsilon_1 - \varepsilon_2)\nabla(E \cdot E) \quad \text{(equation 1)}$$

$$E_t = \frac{V/\varepsilon_2}{\frac{t}{\varepsilon_2} + \frac{d-t}{\varepsilon_1} + \frac{d_p}{\varepsilon_p}} \Rightarrow E_{t \to d} = \frac{V}{d}\ E_{t \to 0} = \frac{V\varepsilon_1}{d\varepsilon_2} \quad \text{(equation 2)}$$

Figure 9B:
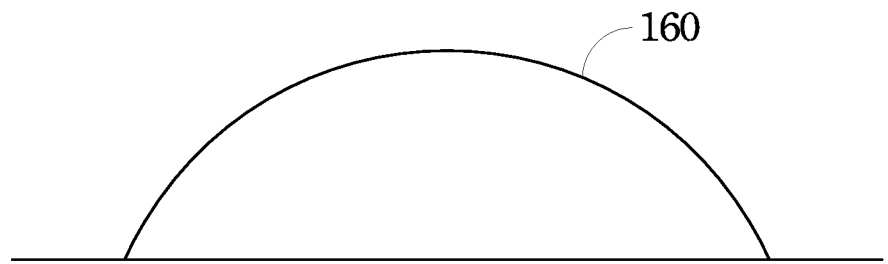
Figure 9C:
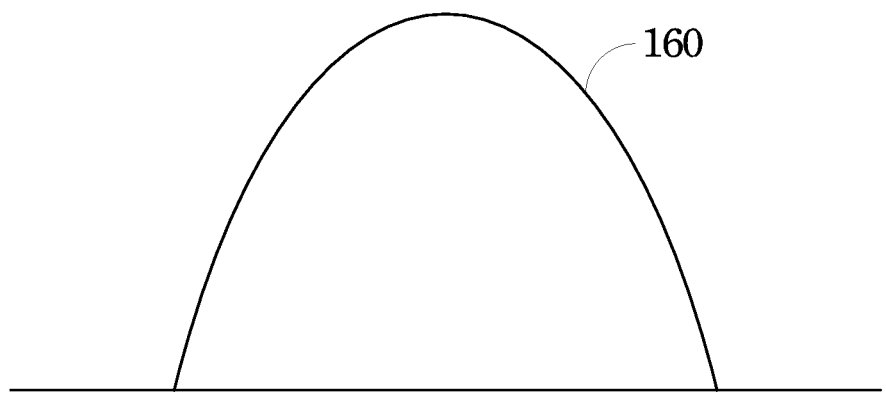

In the present embodiment, $\epsilon_1$ is the dielectric coefficient of air and equals to about 1, and $\epsilon_2$ is the dielectric coefficient of NOA63 lens material and is about 2.7. Therefore, in this case, force applied on the central lens is greater than that on its edge, thus forming a shape similar to a pyramid (as shown in FIG. 9C). The shape of the liquid material of lens is shown in FIG. 9B while the power supply DC does not provide voltage.

The diameter d of the first opening 125 of the electrode layer 122 in the FIG. 8 is mainly used to change the electrostatic field gradient in the system. When the value of d changes, it can affect the distribution of the electrostatic field in the edge of the liquid material of lens 160, and the non-uniform level of electric field in the edge of the liquid material of lens 160 becomes greater as the d value decreases, and thus the electrostatic force applied on the edge of the liquid material of lens 160 gets larger. The following table shows the relationships of the electrode layers 122 and forces applied on the liquid material of lens 160.

| diameter of lens | height of lens | normalized electrostatic force ×100 | | |
|---|---|---|---|---|
| X(mm) | Y(mm) | d = 1.1 mm | d = 1 mm | d = 0.9 mm |
| 0 | 0.45 | 100 | 100 | 100 |
| 0.0487 | 0.448 | 97.95 | 98.06 | 98.11 |
| 0.0987 | 0.441 | 93.74 | 94.05 | 94.38 |
| 0.149 | 0.431 | 88.1 | 88.89 | 89.57 |
| 0.197 | 0.417 | 81.42 | 82.84 | 84.05 |
| 0.245 | 0.399 | 73.07 | 75.22 | 77.15 |
| 0.291 | 0.377 | 63.99 | 67.1 | 69.83 |
| 0.335 | 0.352 | 53.81 | 57.92 | 61.65 |
| 0.375 | 0.325 | 42.37 | 47.58 | 52.25 |
| 0.413 | 0.294 | 30.35 | 36.44 | 42.09 |
| 0.449 | 0.259 | 19.51 | 26.47 | 33.08 |
| 0.493 | 0.22 | 10.36 | 17.97 | 25.61 |
| 0.513 | 0.18 | 3.54 | 11.28 | 19.85 |
| 0.54 | 0.137 | 0.182 | 7.03 | 16.12 |
| 0.564 | 0.092 | 0.071 | 6.37 | 14.06 |
| 0.584 | 0.046 | 0 | 0 | 13.37 |
| 0.6 | 0 | 0 | 0 | 0 |

Figure 10:
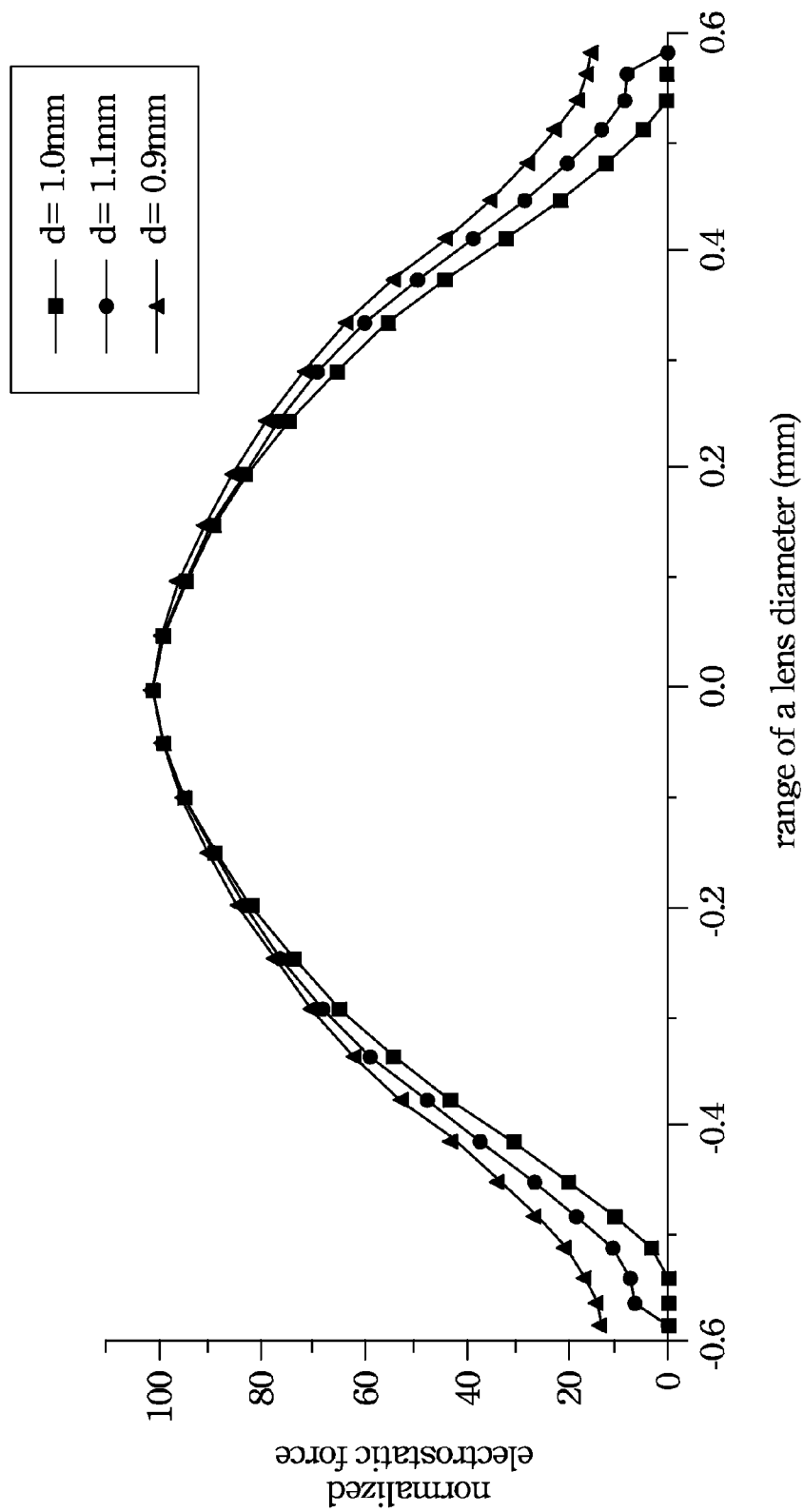
FIG. 10 illustrates an electrostatic force gradient distribution diagram for different designs of electrode layer.

FIG. 10 is an electrostatic force distribution diagram with different d values in the electrode layer 122 according to the above table. The force on the edge of the lens increases when the lower electrode d value becomes smaller, such that the gradient of the electrostatic force gets smoother.

In conclusion, the present invention uses the micro-electromechanical manufacturing technique and a manner of combining 2D electrostatic force, embedded electrodes, and micro apertures to adjust the liquid spherical lens to be an aspherical shape by using non-contact force. The liquid aspherical lens is combined with an optical glass substrate with different refractive coefficients to form a composite micro aspherical lens component which is then cut to form an individual lens component, thereby meeting the design specification and solving the problems that lenses are difficult to be manufactured with fringes and to be assembled. The present invention also solves the problems of designing a large curvature shape required for manufacturing a high-level plastic aspherical lens with a high NA value.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

What is claimed is:

1. A method of manufacturing a lens device, the method comprising:
   (a) providing a transparent substrate;
   (b) forming an electrode layer on the transparent substrate;
   (c) forming a first opening in the electrode layer for exposing an area of the transparent substrate via the first opening;
   (d) forming a hydrophobic layer on the electrode layer, wherein the hydrophobic layer has a second opening connected to the first opening, and the second opening is larger than the first opening for exposing a portion of the electrode layer adjacent to a peripheral edge of the first opening;
   (e) providing a liquid material of lens on the area of the transparent substrate, wherein the liquid material of lens contacts the portion of the electrode layer adjacent to the peripheral edge of the first opening for enhancing adhesion;
   (f) applying an electrostatic force to the liquid material of lens for adjust ing a shape of the liquid material of lens to be a liquid aspherical lens; and
   (g) curing the liquid aspherical lens to form a solid aspherical lens.

2. The method of manufacturing the lens device of claim 1, wherein the step (c) comprises:
   patterning a positive photoresist on the electrode layer;
   etching the electrode layer to form the first opening after the positive photoresist is patterned; and
   removing the positive photoresist.

3. The method of manufacturing the lens device of claim 1, wherein the step (d) comprises:
   performing a surface treatment on the area of the transparent substrate;
   forming a positive photoresist on the area of the transparent substrate, wherein an outer portion of the positive photoresist extends above the portion of the electrode layer adjacent to the peripheral edge of the first opening;
   providing a hydrophobic material to overlay the positive photoresist and the electrode layer; and
   removing the positive photoresist and a portion of the hydrophobic material to form the hydrophobic layer, wherein the portion of the hydrophobic material adheres to the positive photoresist directly.

4. The method of manufacturing the lens device of claim 1, wherein the step (f) comprises:
   providing an upper electrode plate above the transparent substrate; and
   providing a voltage difference between the upper electrode plate and the electrode layer so as to produce the electrostatic force applied on the liquid material of lens.

5. The method of manufacturing the lens device of claim 1, wherein the liquid material of lens is a light-curing plastic material, and the step (g) comprises:
   illuminating the liquid aspherical lens to form the solid aspherical lens.

6. The method of manufacturing the lens device of claim 1, wherein the transparent substrate is a transparent glass substrate or a transparent plastic substrate.

7. The method of manufacturing the lens device of claim 1, wherein the electrode layer is a metal layer.

8. A lens device comprising:
   a transparent substrate;
   a metal layer formed on the transparent substrate, wherein the metal layer has a first opening, such that an area of the transparent substrate that is exposed via the first opening is not covered with the metal layer;
   a hydrophobic layer formed on the metal layer, wherein the hydrophobic layer has a second opening connected to the first opening, and the second opening is greater than the first opening, such that a portion of the metal layer adjacent to a peripheral edge of the first opening is not covered by the hydrophobic layer; and
   an aspherical lens formed on the area of the transparent substrate and contacting the portion of the metal layer adjacent to the peripheral edge of the first opening.

9. The lens device of claim 8, wherein the transparent substrate is a transparent glass substrate or a transparent plastic substrate.

10. The lens device of claim 8, wherein the material of the aspherical lens comprises a light-curing plastic material.

* * * * *